(12) United States Patent
Capella

(10) Patent No.: US 8,957,628 B2
(45) Date of Patent: Feb. 17, 2015

(54) METHOD AND SYSTEM FOR DISTINGUISHING BETWEEN CHARGING PORTS

(71) Applicant: Broadcom Corporation, Irvine, CA (US)

(72) Inventor: Sebastian Joseph Capella, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 176 days.

(21) Appl. No.: 13/733,092

(22) Filed: Jan. 2, 2013

(65) Prior Publication Data

US 2013/0175980 A1    Jul. 11, 2013

Related U.S. Application Data

(63) Continuation of application No. 12/661,924, filed on Mar. 25, 2010, now Pat. No. 8,362,741.

(51) Int. Cl.
*H02J 7/00* (2006.01)

(52) U.S. Cl.
CPC .............. *H02J 7/00* (2013.01); *H02J 7/0004* (2013.01); *H02J 7/0006* (2013.01); *H02J 7/0052* (2013.01); *H02J 2007/0001* (2013.01); *H02J 2007/0062* (2013.01)

USPC ........................................................ 320/107

(58) Field of Classification Search
CPC . G06F 1/266; H02J 2007/0062; H02J 7/0052; H02J 7/00; H02J 2007/0001; H02J 7/0055; H02J 7/0004
USPC ......... 320/106–115, 137, 138; 710/10, 14, 16
See application file for complete search history.

(56) References Cited

U.S. PATENT DOCUMENTS

2010/0070659 A1    3/2010  Ma et al.

OTHER PUBLICATIONS

Battery Charging Specification, Rev. 1.1, Apr. 15, 2009, available at http://www.usb.org/developers/docs/devclass_docs/.*
Chinese Office Action issued Oct. 15, 2012 in Chinese Application No. 201010276852.5, 6 pages.

* cited by examiner

*Primary Examiner* — Melissa Koval
*Assistant Examiner* — Daniel Miller
(74) *Attorney, Agent, or Firm* — Oblon, Spivak, McClelland, Maier & Neustadt, L.L.P.

(57) ABSTRACT

Disclosed is a method for use by a device to distinguish between a Charging Downstream Port ("CDP") and a Dedicated Charging Port ("DCP"). The method comprises detecting that the device is attached to a charging port, and determining whether the charging port is the CDP or the DCP without causing a host coupled to the CDP to be able to detect the device if the charging port is the CDP.

20 Claims, 5 Drawing Sheets

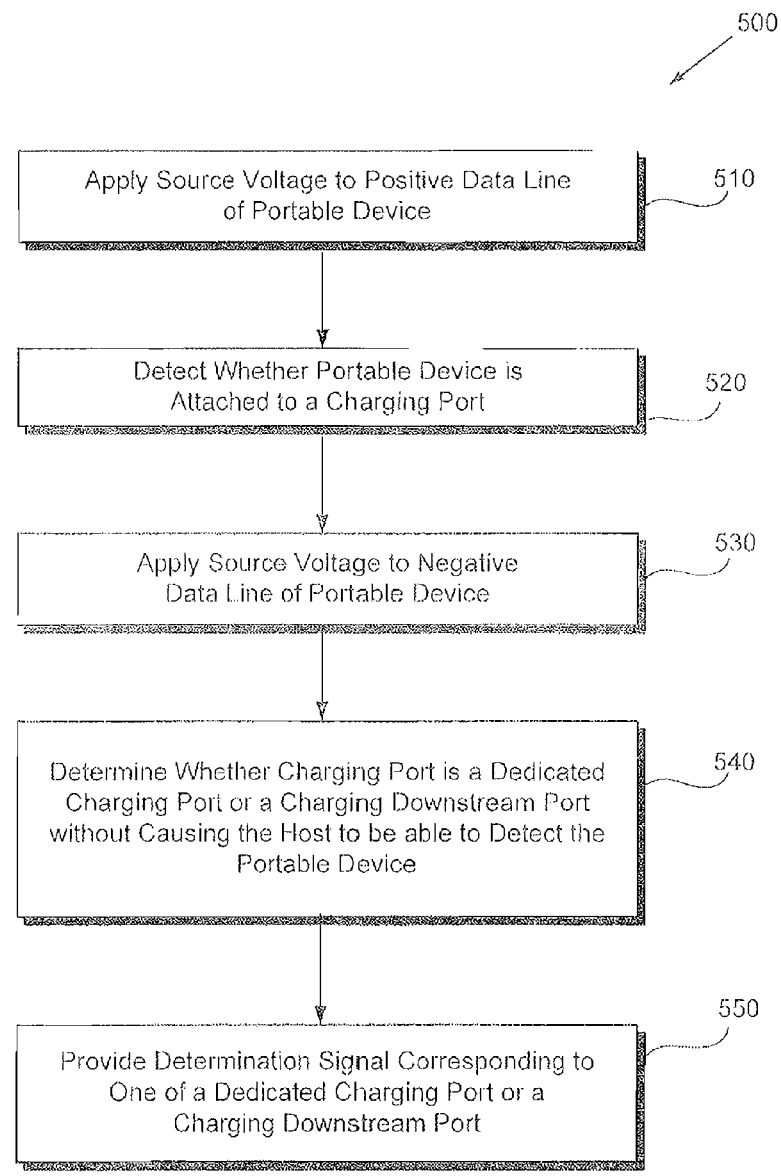

METHOD AND SYSTEM FOR DISTINGUISHING BETWEEN CHARGING PORTS

RELATED APPLICATIONS

This application is a continuation of U.S. application Ser. No. 12/661,924, filed Mar. 25, 2010, which claims priority to U.S. Provisional Application No. 61/276,469 filed Sep. 10, 2009, which is hereby incorporated by reference in its entirety.

BACKGROUND OF THE INVENTION

1. Field of the Invention

The present invention is generally in the field of communication methods and systems. More specifically, the present invention is in the field of network communication methods and systems.

2. Background Art

Universal Serial Bus ("USB") ports provide convenient locations and an efficient power solution to charge portable devices using a widely adaptable USB cable and a personal computer, hub or USB charger. Portable devices, however, must accommodate the fact that a personal computer or hub draws a different amount of current than a USB charger. Consequently, a portable device must distinguish between different types of charging ports, including a Dedicated Charging Port ("DCC")—a charging port corresponding to a USB charger, and a Charging Downstream Port ("CDP")—a charging port corresponding to a personal computer or hub. A more detailed description of the general standards for charging portable devices using USB technology may be found in the USB Battery Charging Specification, Revision 1.1, published by USB Implementers Forum, Inc. (www.usb.org) on Apr. 15, 2009 (the "BC Spec"), which is hereby incorporated by reference in its entirety.

Conventional schemes to distinguish between CDP and DCP have a number of shortcomings. For example, as explained below, the detection process used in conventional schemes cause personal computers or hubs (using CD) to begin communication with the portable device, although the portable device merely intends to determine the type of charging port.

FIG. 1 shows dedicated charging port ("DCP") circuit 100 adapted to connect to a portable device. Supply voltage pin 106 provides a positive supply voltage of a value $V_{BUS}$ to DCP circuit 100, and ground pin 112 provides a ground voltage to DCP circuit 100. Positive data line 108 and negative data line 110 are connected through a resistor or resistive network such as resistor 104 with value $R_{CHG\_DAT}$. As described in the BC Spec, operates at 5.25 Volts (V) and $V_{BUS}$ $R_{CHG\_DAT}$ has a value or 200 ohms. DCP circuit 100 may provide a portable device with up to 1.8 Amperes (A) of current at 5.25 V through supply voltage pin 106. Since DCP circuit 100 shorts positive data line 108 and negative data line 110 with resistor 104, DCP circuit 100 does not transfer data to or from a connected portable device. For example, a binary signal that has a step transition between a logical LOW value of below 0.8 V and a logical HIGH value of above 2.0 V on positive data line 108 merely returns to negative data line 110 through resistor. Consequently, DCP circuit 100 can charge a portable device but is incapable of processing logical data for a portable device or supporting data communications between a host and a device.

FIG. 2 illustrates charging downstream port ("CDP") circuit 200. CDP circuit 200 includes supply voltage pin 206, ground pin 212, positive data line 208 and negative data line 210. These pins are similar to respective pins illustrated in DCP circuit 100 of FIG. 1. Internally, CDP circuit 200 includes positive switch 236, positive pull-down resistor 220, comparator 228, positive data line current sink 230, negative data line voltage source 224, negative switch 226, negative pull-down resistor 222, and AND gate 240. Portable detect signal 238 comes from AND gate 240 into physical layer 204. Portable detect signal 238 may be configured to correspond to digital logic values, including for example, a value of 0 to 0.8 V corresponding to a logical LOW signal and a value of above 2.0 V corresponding to a logical HIGH signal. As shown in FIG. 2, CDP circuit 200 includes comparator 228, as well as leakage resistors 216 and leakage voltages 218. Positive data line current sink 230 is configured to draw between 50 and 150 microamperes (µA) of current. Negative data line voltage source 224 is configured to provide between 0.5 and 0.7 V. Data detect voltage 232 provides a voltage between 0.25 and 0.4 V.

CDP circuit 200 in FIG. 2 is capable of supporting data communication between a host coupled thereto and a device. More specifically, CDP circuit 200 can receive differential signals corresponding to logical LOW or logical HIGH voltages in differential form across positive data line 208 and negative data line 210. These differential voltages may correspond to packetized information, including for example, control instructions or data, which are used for communicate between the portable device and a host coupled to CDP circuit 200.

One means of communication via a CDP circuit 200 is by driving a voltage equal to negative data line voltage source 224 onto negative data line 210. When CDP circuit 200 receives a voltage on positive data line 208 that is greater than data detect voltage 232 and is less than the logic threshold of CDP circuit 200 (namely below the logical LOW threshold voltage value of 0.8 V), portable detect signal 238 is asserted. CDP circuit 200 actively responds to this signal by switching negative switch 226 and driving the voltage at negative data line voltage source 224 onto negative data line 210, actively transmitting that value back to the portable device. For example, if a voltage on positive data line 210 lies between 0.4 V (the maximum value of data detect voltage source 224) and 0.8 V (the minimum value of the logic threshold voltage), a voltage of between 0.5 V and 0.7 V corresponding to negative data line voltage source 224 will be applied to negative data line 210 and transmitted back to the portable device.

Turning to FIG. 3, FIG. 3 illustrates conventional portable device circuit 300 adapted to connect to either a DCP or a CDP. Conventional portable device circuit 300 comprises pins to interface to a DCP or a CDP, including supply voltage pin 306 to draw charge, ground pin 312, positive data line 308, negative data line 310 and ID pin 314. Positive data line 308 and negative data line 310 allow conventional portable device circuit 300 to distinguish between a DCP or a CDP using logical signals in differential form.

Internally, conventional portable device circuit 300 includes voltage switch 352, current switch 354, comparator switch 356, pull-down switch 368, and pull down resistor 370. Conventional portable device circuit 300 further includes positive data line voltage source 348, data connect detect current source 350, negative data line current sink 358, data detect voltage 360 and AND gate 364. Comparator 362 is capable of comparing data detect voltage 360 with a voltage on negative data line 310. Charger detect signal 366 comes into physical layer 342 through AND gate 364. Physical layer 342 includes leakage resistors 344 with leakage voltages 346. Negative data line current sink 358 is configured to draw between 50 and 150 microamperes (μA) of current. Positive data line voltage source 348 is configured to provide between 0.5 and 0.7 V.

During a start-up sequence, conventional portable device circuit 300 is required to detect a charging port and classify the detected charging port as a DCP or a CDP to determine how much current it can draw from the charging port. Conventional portable device circuit 300 begins operation in low bandwidth of full bandwidth mode. Conventional portable device circuit 300 then closes voltage switch 352, current switch 354 and comparator switch 356 to raise the voltage on positive data line 308 to positive data line source voltage 348, that is to a logical HIGH. After a positive voltage source on time of about 40 milliseconds (ms), conventional portable device circuit 300 then checks the voltage at negative data line 310. If the voltage at negative data line 310 is above data detect voltage 360 but below the logic threshold of conventional portable device circuit 300, conventional portable device circuit 300 has detected that a charging port is attached and is allowed to draw a specified portable device current from the charging port.

To classify the attached charging port as a DCP or a CDP, conventional portable device circuit 300 asserts a logical HIGH value (that is a value exceeding the circuit's logical threshold voltage of 2.0 V) onto positive data line 308. If the attached charging port is a DCP, the voltage on negative data line 310 will also go to a logical HIGH value, because a DCP shorts positive data line 308 and negative data line 310 through an internal resistor (shown in FIG. 1). Thus, despite the presence of the internal resistor, the voltage at negative data line will reach a logical HIGH value and allow conventional portable device circuit 300 to determine that a DCP is connected. In such a case, conventional portable device circuit 300 and may attempt to draw a current of up to 1.8 A.

On the other hand, if the attached port is a CDP, the voltage on positive data line 308 will cause a communication with the portable device. Consistent with FIG. 3, the voltage on positive data line 308 will correspond to a logical HIGH. The CDP will recognize a voltage exceeding the logical threshold value, and will not drive that voltage to negative data line 310 thereby communicating a voltage value of a logical LOW back to conventional portable device circuit 300. Thus, if a CDP is attached, the voltage at negative data line 310 will remain at a logical LOW value of below 0.8 V despite the fact that the voltage at positive data line 308 was raised to a logical HIGH value. In such a case, conventional portable device circuit 300 will know that a CDP is attached. Conventional portable device circuit 300 will draw a current of 1.5 A at low or full bandwidths. If a CDP is attached, the USB system may later enter high bandwidth mode and draw a current 900 mA in that mode. Requiring the CDP to process the logical transitions outlined above and requiring the CDP to communicate a voltage value of a logical LOW back to conventional portable device circuit 300 undermines the robustness of the USB system, as it causes the host coupled to the CDP to attempt data communications with the portable device that is merely trying to determine the type of charging port.

Accordingly, there is a need to overcome the drawbacks and deficiencies in the art by providing methods and systems for a portable USB-compatible devices for distinguishing between charging ports, which enhance interoperability of the portable device with the charging port, while remaining compatible with existing USB technology.

SUMMARY OF THE INVENTION

There are provided methods and systems for distinguishing between charging ports, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art alter reviewing the following detailed description and accompanying drawings, wherein:

FIG. 5 is a flowchart presenting a method for distinguishing between charging ports according to one embodiment of the present invention.

DETAILED DESCRIPTION OF THE INVENTION

Figure 1:
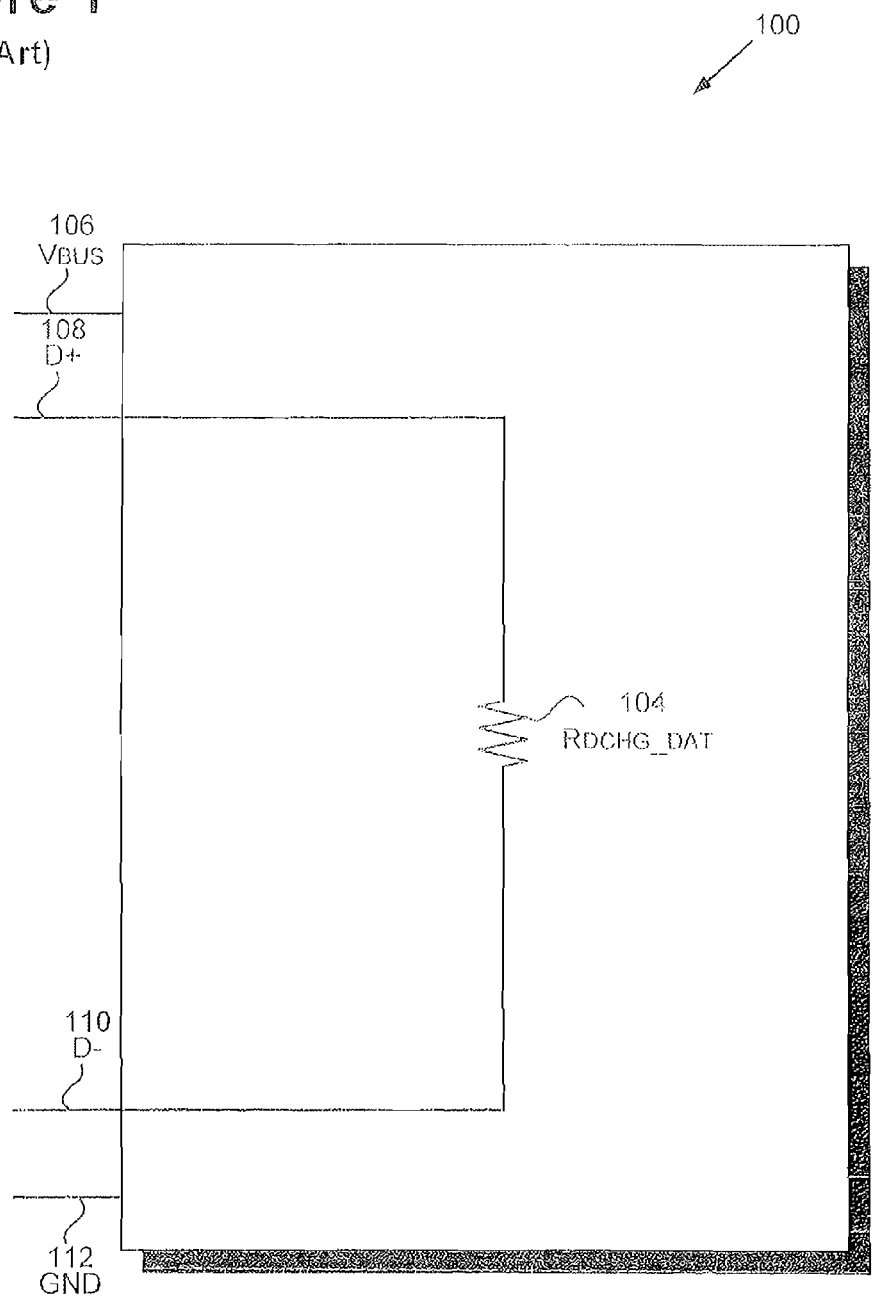
FIG. 1 shows a conventional dedicated charging circuit.

The present invention is directed to a method and system for distinguishing between charging ports. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art. The drawings in the present application and their accompanying detailed description are directed to merely exemplary embodiments of the invention. To maintain brevity, other embodiments of the invention, which use in principles of the present invention are not specifically described in the present application and are not specifically illustrated by the present drawings. It should be borne in mind that, unless noted otherwise, like or corresponding elements among the figures may be indicated by like or corresponding reference numerals. Moreover, the drawings and illustrations in the present application are generally not to scale, and are not intended to correspond to actual relative dimensions.

Figure 4:
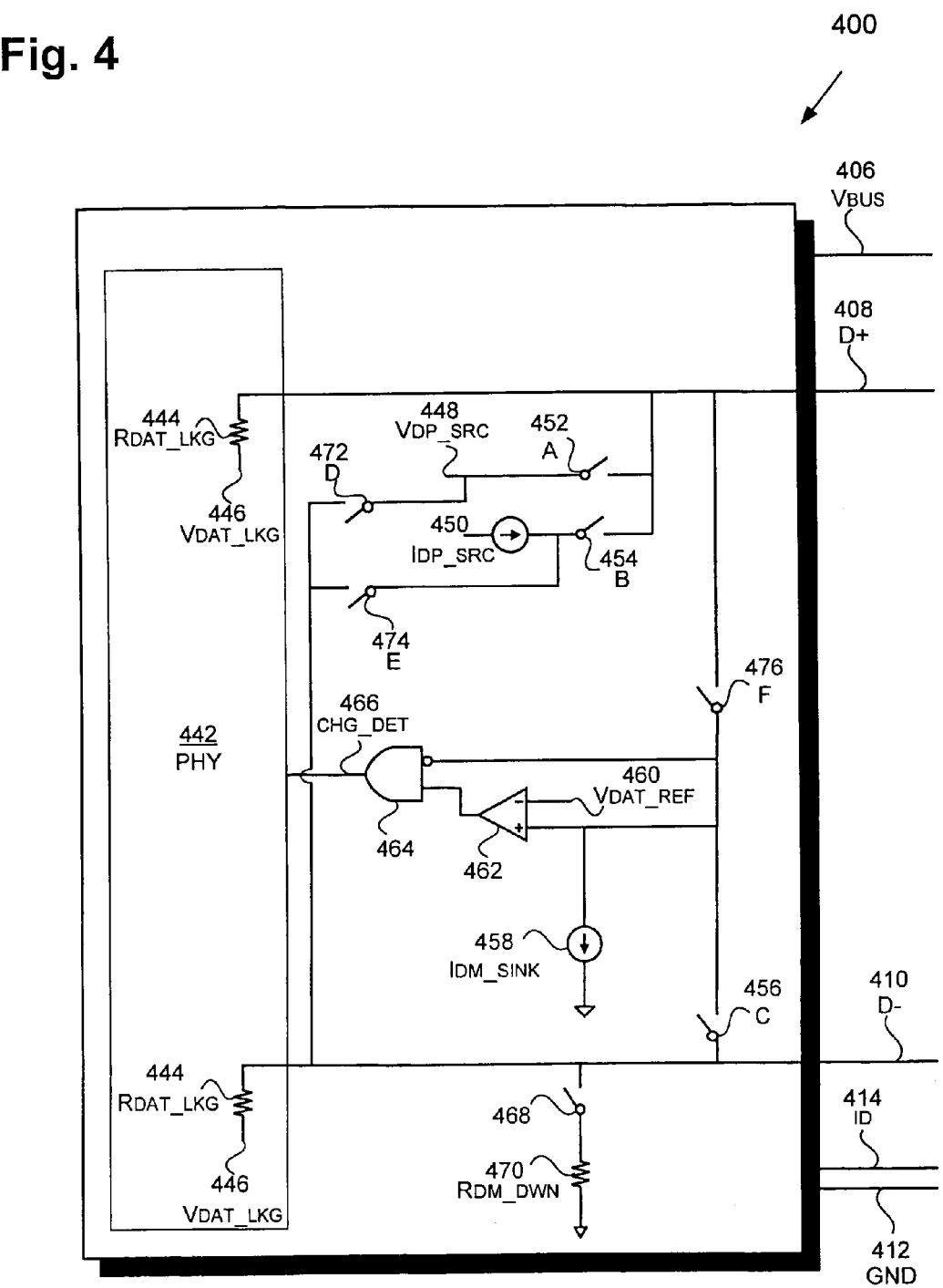
FIG. 4 shows a portable device circuit, according to one embodiment of the present invention.

FIG. 4 illustrates portable device circuit 400 capable of distinguishing between charging ports without causing the host to be able to detect the device, which could result in a data communication initiation by a host coupled to a CDP with the portable device. Portable device circuit 400 may interface with a charging port through supply voltage pin 406 to draw charge, ground pin 412, positive data line 408, negative data line 410 and ID pin 414. Positive data line 408 and negative data line 410 may allow portable device circuit 400 to communicate with a charging port with logical signals in differential form.

Internally, portable device circuit 400 may comprise voltage switch 452, current switch 454, comparator switch 456, pull-down switch 468, and pull down resistor 470. Conventional portable device circuit 400 may also include positive data line voltage source 448, data connect detect current source 450, negative data line current sink 458, data detect voltage 460 and AND gate 464. Portable device circuit 400 may further comprise comparator 462 to compare data detect voltage 460 with a voltage on negative data line 410. AND gate 464 may output charger detect signal 466 into physical layer 442. Physical layer 442 may include leakage resistors 444 with leakage voltages 446.

Portable device circuit 400 may further include second voltage switch 472 connected between negative data line 410 and voltage source 448, second current switch 474 connected between negative data line 410 and current source 450 and exemplary positive comparator switch 476 connected between positive data line 408 and AND gate 464. Consistent with the BC Spec, negative data line current sink 458 may be configured to draw between 50 and 150 µA of current. Moreover, positive data line voltage source 448 may provide between 0.5 and 0.7 V. Data detect voltage 460 may supply a voltage between approximately 0.25 and 0.4 V. Consistent with the BC Spec, exemplary voltages of below 0.8 V and above 2.0 V may govern respective logical LOW and HIGH voltages for portable device circuit 400.

The exemplary embodiment of a system for distinguishing between charging ports illustrated in FIG. 4 will be further described by reference to flowchart 500 in FIG. 5, which describes the steps, according to one embodiment of the present invention, of a method for distinguishing between charging ports. It is noted that certain details and features have been left out of flowchart 500 that are apparent to a person of ordinary skill in the art. For example, a step may comprise one or more substeps as known in the art. While steps 510 through 550 indicated in flowchart 500 are sufficient to describe one embodiment of the present invention, other embodiments of the invention, may utilize steps different from those shown in flowchart 500.

Beginning with step 510 of flowchart 500 and referring to FIG. 4, step 510 includes applying a source voltage to positive data line 408 of portable device circuit 400. As illustrated in FIG. 4, step 510 comprises closing voltage switch 452, current switch 454 and comparator switch 456. In step 510, second voltage switch 472 second current switch 474 and second comparator switch 476 are held open. Closing switches 452, 454 and 456, and opening switches 472, 474 and 476 raise the voltage on positive data line 408 to the value of positive data line source, voltage 448, that is a value between, for example, 0.5 V and 0.7 V. As a result, a source voltage is applied to positive data line 408 of portable device circuit 400.

Figure 2:
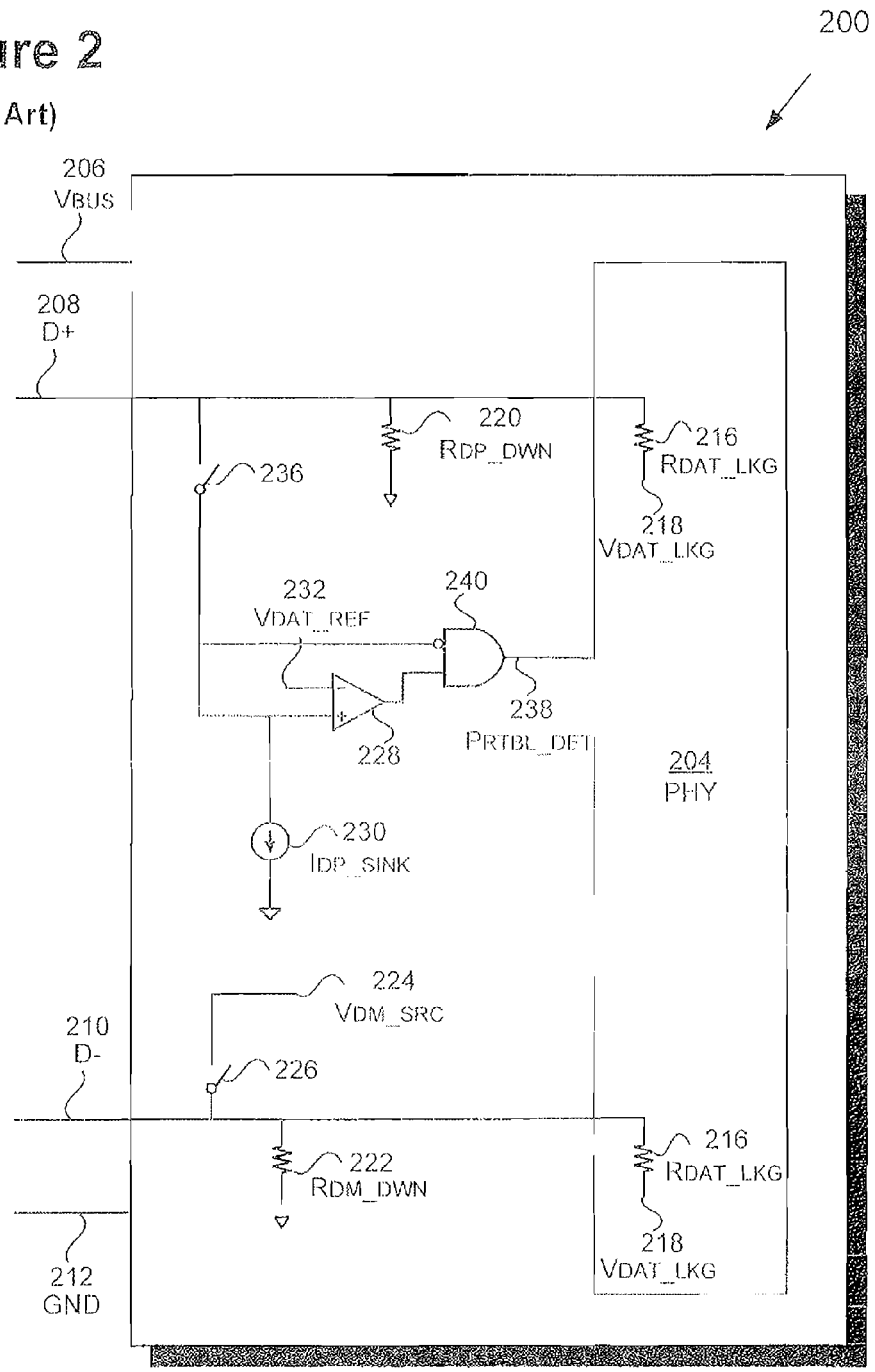
FIG. 2 shows a conventional charging downstream circuit.
Figure 3:
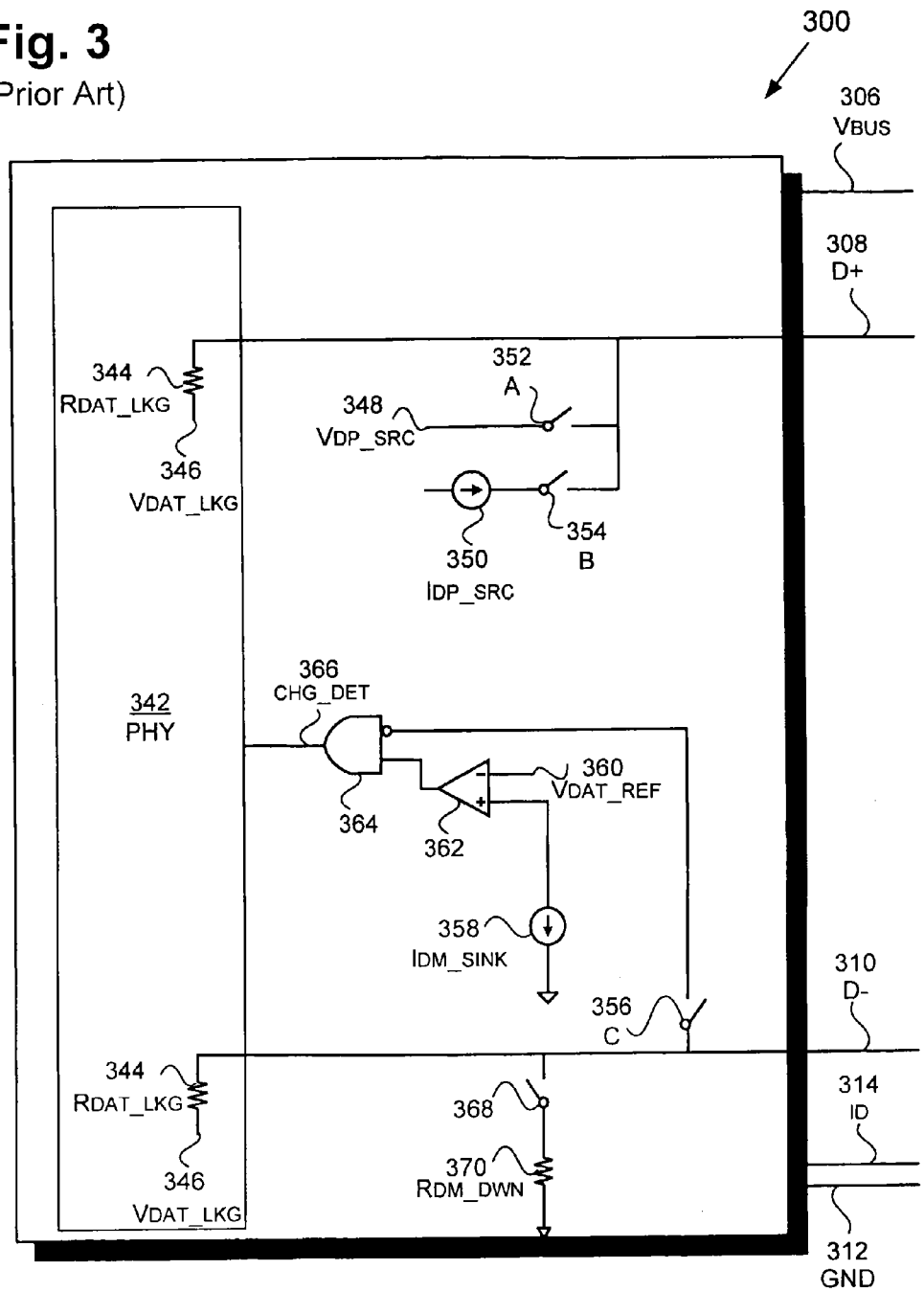
FIG. 3 shows a conventional portable device circuit.

Continuing to step 520 of flowchart 500 and referring to FIGS. 2 and 4, step 520 comprises detecting whether the portable device is attached to a charging port. With reference to FIG. 4, portable device circuit 400 is configured to wait a first specified time period, e.g. 40 ms, and then evaluating whether the voltage on negative data line is non-zero. If no charging port is attached, the voltage on negative line may stay at a zero value, for example 0 V.

However, if a charging port is attached to portable device circuit 400, the positive source voltage is detected on negative data line 408. For example, a DCP connected to portable device circuit 400 would pass the source voltage through an internal resistor (shown as resistor 104 in FIG. 1) and ultimately raise the voltage of negative data line 410 in FIG. 4 to a non-zero value. Similarly, an attached CDP would detect the source voltage at positive data line 40i and would apply a negative source voltage to negative data line 410. With reference to FIG. 2, CDP circuit 200 would detect the positive source voltage at positive data line 208 and would close negative switch 226. CDP circuit 200 would further apply negative data line voltage source 224 corresponding to a voltage of between approximately 0.5 and 0.7 V to negative data line 210. Returning to FIG. 4, the negative source voltage would appear on negative data line 410. As such, portable device circuit 400 may be configured to detect whether a charging port is attached.

Continuing to step 530 of flowchart 500 and referring to FIG. 4, step 530 of flowchart 500 comprises applying a source voltage to the negative data line of the portable device. With reference to FIG. 4, portable device circuit 400 is configured to wait a second specified time period. The second specified time period could be equal to or different than the first specified time period. For example, like the first specified time period, the second specified time period could be 40 ms. After the second specified time period, portable device circuit 400 changes the polarity of switches 452, 454, 456, 472, 474 and 476 and then applies a source voltage to negative data line 410.

More specifically, portable device circuit 400 opens voltage switch 452, current switch 454 and comparator switch 456, which were all closed in step 510. Portable device circuit 400 also closes second voltage switch 472, second current switch 474 and second comparator switch 476, which were all held open in step 510. Thus, pursuant to step 530, positive data line 408 is disconnected from each of positive data line voltage source 448, data connect detect current source 450, negative data line current sink 458, comparator 462 and AND gate 464. Conversely, under step 530, negative data line 410 is connected to each of positive data line voltage source 448, data connect detect current source 450, negative data line current sink 458, comparator 462 and AND gate 464. As a result of step 530, the voltage at positive data line voltage source 448, which may range between 0.5 V and 0.7 V, is applied to negative data line 410. Thus, pursuant to step 530, portable device circuit 400 is configured to apply a source voltage to negative data line 410.

Turning to step 540 of Flowchart 500 and referring to FIGS. 1, 2 and 4, step 540 comprises determining whether the detected charging port is a DCP or a CDP without causing the host coupled to CDP to be able to detect the device, as a result of the detection process, which could result in the host starting a data communication with the device via the CDP. With reference to FIG. 4, portable device circuit 400 is configured to wait a third specified time period the third specified time period could be equal to or different than the first or second specified time periods. For example, the third specified time period could be 40 ms. After the third time period, portable device circuit 400 measures the voltage on positive data line 408 to determine whether a DCP or a CDP is attached.

In the event that a DCP is attached to portable device circuit 400, the path between negative data line 410 and positive data line 408 will comprise a resistive network. With reference to FIGS. 1 and 4, if DCP circuit 100 in FIG. 1 were connected to portable device circuit 400 in FIG. 4, the applied source voltage would be passed through internal resistor 104 in FIG. 1, raising the voltage of positive data line 408 in FIG. 4 to a value approximately equal to the value of the applied source voltage. The voltage at positive data line 408 may, however, be detected by comparator 462. The resulting voltage will cause output charger detect signal 466 from AND gate 464 to go to a logical HIGH value, and correspond to the determination of a DCP.

Conversely, in the event that a CDP is attached to portable device circuit 400, the applied source voltage will not transfer to positive data line 408. With reference to FIGS. 2 and 4, if CDP circuit 200 in FIG. 2 were connected to portable device circuit 400 in FIG. 4, the applied source voltage would pass through negative pull-down resistor 222 in FIG. 2 to a ground node and leakage resistor 216 in FIG. 2 into physical layer 204 in FIG. 2. As no path within CDP circuit 200 connects negative data line 210 and positive data line 208 in FIG. 2, the applied source voltage would not transfer to positive data line 208. Returning to FIG. 4, the voltage at positive data line 408 will not reflect the source voltage previously applied to negative data terminal 410. As such, comparator 462 will not detect a change in positive data line 408. The resulting voltage will cause output charger detect signal. 466 from AND gate 464 to go to a logical LOW value, and will correspond to the determination of a CDP.

Accordingly, the determination of the charging port as a DCP or a CDP does not cause the host to be able to detect the device, which could result in a data communication initiation by a host coupled to a CDP with the portable device. Consistent with FIG. 4, positive source voltage 448 may cause a voltage of between 0.5 V and 0.7 V to be applied to negative data line 410. This voltage is less than the minimum voltages corresponding to a logical swing across negative data line 410 and positive data line 408. More specifically, positive source voltage 448 applies a voltage less than the value of a differential signal across negative data line 410 and positive data line 408. Thus, applying the voltage to negative data line 410 will not appeal as an attempt to start data communication with the host via the CDP. Accordingly, an embodiment of the present invention may determine whether the detected charging port is a DCP or a CDP without causing a communication to occur via the CDP or without causing the host to be able to detect the device.

Turning to step 550 of flowchart 500 and referring to FIG. 4, step 550 comprises providing a determination signal corresponding to one of a DCP or a CDP. Portable device circuit 400 may be used to provide a signal corresponding to a DCP or a CDP. For example, charger detect signal 466 may be adapted to return a logical HIGH value when a DCP is detected. Alternatively, charger detect signal 466 may be adapted to return a logical LOW value when a CDP is detected. Accordingly, portable device circuit 400 may be adapted to provide a determination signal corresponding to one of a DCP or a CDP.

Thus, the present application discloses a novel and inventive solution for distinguishing between charging ports, especially those charging ports of a USB system. By selectively applying a source voltage to positive and negative data lines of a portable device, the present invention distinguishes charging ports without causing the host to be able to detect the device, which could result in a data communication initiation by a host coupled to a CDP with the device. Moreover, the disclosed solution is advantageously compatible with existing USB technology. Although embodiments of the present invention are described in conjunction with a portable device, the present invention is not limited to portable devices and is equally applicable to all types of devices.

From the above description of the invention it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for use by a device to distinguish between a Charging Downstream Port (CDP) and a Dedicated Charging Port (DCP), said method comprising:
    connecting a voltage source in said device to a positive data line of said device;
    detecting whether said device is connected to a charging port while said voltage source is connected to said positive data line;
    disconnecting said voltage source from said positive data line;
    connecting said voltage source in said device to a negative data line of said device; and
    determining whether said charging port is said DCP or said CDP by measuring a voltage on said positive data line while said voltage source is connected to said negative data line,
    wherein a voltage value of said voltage source is less than a logical high threshold value of said CDP.

2. The method of claim 1, wherein said detecting whether said device is connected to a charging port is performed a first predetermined time period after said connecting said voltage source to said positive data line.

3. The method of claim 1, wherein said detecting whether said device is connected to said charging port is based on a measured voltage on said negative data line while said voltage source is connected to said positive data line.

4. The method of claim 1, wherein said detecting whether said device is connected to said charging port further comprises comparing a voltage on said negative data line with a reference voltage utilizing a comparator in said device.

5. The method of claim 1, wherein said connecting said voltage source to said positive data line comprises closing a first switch disposed between said voltage source and said positive data line.

6. The method of claim 1, wherein said disconnecting said voltage source from said positive data line comprises opening a first switch disposed between said voltage source and said positive data line and wherein said connecting said voltage source in said device to said negative data line comprises closing a second switch disposed between said voltage source and said negative data line.

7. The method of claim 1, wherein said connecting said voltage source in said device to said negative data line is performed a second predetermined time period after said detecting whether said device is connected to said charging port.

8. The method of claim 1, wherein said measuring said voltage on said positive data line is performed a third predetermined time period after said connecting said voltage source to said negative data line.

9. The method of claim 1, wherein said measuring said voltage on said positive data line comprises:
    opening a third switch disposed between an input of a comparator in said device and said negative data line of said device; and
    closing a fourth switch disposed between said input of said comparator and said positive data line.

10. The method of claim 9, wherein said measuring said voltage on said positive data line further comprises comparing a voltage on said positive data line with a reference voltage utilizing said comparator.

11. A device for distinguishing between a Charging Downstream Port (CDP) and a Dedicated Charging Port (DCP), the device comprising:
    a first switch disposed between a voltage source in said device and a positive data line of said device, said first switch configured to connect said voltage source to said positive data line;
    a second switch disposed between said voltage source and a negative data line of said device, said second switch configured to connect said voltage source to said negative data line;
    a detection circuit configured to detect whether said device is attached to a charging port based on a measured voltage on said negative data line while said voltage source is connected to said positive data line; and a determination circuit configured to determine whether said charging port is said CDP or said DCP by measuring a voltage on said positive data line while said voltage source is connected to said negative data line, wherein a voltage value of said voltage source is less than a logical high threshold value of said CDP.

12. The device of claim 11, wherein said detection circuit is configured to detect, at a first predetermined time period after connecting said voltage source to said positive data line, whether said device is connected to said charging port.

13. The device of claim 11, wherein said determination circuit is configured to determine whether said charging port is said CDP or said DCP a second predetermined time period after said detection circuit detects whether said device is attached to said charging port.

14. The device of claim 11, further configured to measure said voltage on said positive data line while said voltage source is connected to said negative data line a third predetermined time period after connecting said voltage source to said negative data line.

15. The device of claim 11, further configured to close said first switch and open said second switch before said detection circuit measures said voltage on said negative data line.

16. The device of claim 11, wherein said detection circuit comprises a comparator for comparing a voltage on said negative data line with a reference voltage.

17. The device of claim 16, wherein said determination circuit comprises said comparator for comparing a voltage on said positive data line with said reference voltage.

18. The device of claim 17, further comprising:
a third switch disposed between an input of said comparator and said negative data line; and
a fourth switch disposed between said input of said comparator and said positive data line.

19. The device of claim 18, further configured to open said third switch and close said fourth switch before measuring said voltage on said positive data line.

20. The device of claim 18, further configured to close said third switch and open said fourth switch before measuring said voltage on said negative data line.

* * * * *